(12) United States Patent
Zhang et al.

(10) Patent No.: US 11,506,941 B2
(45) Date of Patent: Nov. 22, 2022

(54) DISPLAY PANEL AND PREPARATION METHOD THEREOF

(71) Applicants: HEFEI BOE DISPLAY TECHNOLOGY CO., LTD., Anhui (CN); BOE TECHNOLOGY GROUP CO., LTD., Beijing (CN)

(72) Inventors: Lin Zhang, Beijing (CN); Hongliang Wang, Beijing (CN); Ke Dai, Beijing (CN)

(73) Assignees: HEFEI BOE DISPLAY TECHNOLOGY CO., LTD., Anhui (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 435 days.

(21) Appl. No.: 16/491,409

(22) PCT Filed: Apr. 3, 2019

(86) PCT No.: PCT/CN2019/081293
§ 371 (c)(1),
(2) Date: Sep. 5, 2019

(87) PCT Pub. No.: WO2020/087869
PCT Pub. Date: May 7, 2020

(65) Prior Publication Data
US 2021/0356792 A1    Nov. 18, 2021

(30) Foreign Application Priority Data
Oct. 29, 2018  (CN) .......................... 201811270370.1

(51) Int. Cl.
*G02F 1/1339*   (2006.01)
*G02F 1/1333*   (2006.01)
*G02F 1/1335*   (2006.01)

(52) U.S. Cl.
CPC ........ *G02F 1/13396* (2021.01); *G02F 1/1339* (2013.01); *G02F 1/13394* (2013.01);
(Continued)

(58) Field of Classification Search
CPC ........... G02F 1/133388; G02F 1/13394; G02F 1/13396; G02F 1/1339; G02F 1/13398;
(Continued)

(56) References Cited

U.S. PATENT DOCUMENTS

2012/0194494 A1* 8/2012 Jung ................ G02F 1/133723
345/208
2012/0257417 A1   10/2012 Lee et al.
(Continued)

FOREIGN PATENT DOCUMENTS

CN   201170823 Y   12/2008
CN   201955487 U    8/2011
(Continued)

OTHER PUBLICATIONS

International Search Report dated Jul. 3, 2019, issued in counterpart application No. PCT/CN2019/082689, with partial English translation. (14 pages).
(Continued)

*Primary Examiner* — Jia X Pan
(74) *Attorney, Agent, or Firm* — WHDA, LLP

(57) ABSTRACT

The present disclosure relates to a display panel. The display panel may include a first substrate, a second substrate opposite the first substrate, and a frame supporting structure between the first substrate and the second substrate in a frame area of the display panel. The frame area of the display panel may surround a display area of the display panel. The frame supporting structure may include a first frame supporting portion on at least one part of a circumference of the display area, the first frame supporting portion
(Continued)

comprises an elastic material, and an elastic recovery rate of the elastic material is above about 80%.

5 Claims, 13 Drawing Sheets

(52) U.S. Cl.
CPC .... *G02F 1/13398* (2021.01); *G02F 1/133388* (2021.01); *G02F 1/133512* (2013.01)

(58) Field of Classification Search
CPC . G02F 1/1341; G02F 1/0107; G02F 1/133512
See application file for complete search history.

(56) References Cited

U.S. PATENT DOCUMENTS

| | | | |
|---|---|---|---|
| 2014/0139784 A1 | 5/2014 | Kawada | |
| 2016/0026017 A1* | 1/2016 | Wang | G02F 1/133377 349/139 |
| 2016/0370631 A1* | 12/2016 | Tang | G02F 1/13394 |
| 2017/0139255 A1 | 5/2017 | Wu et al. | |
| 2017/0146834 A1* | 5/2017 | Tak | G02F 1/133514 |
| 2018/0052347 A1* | 2/2018 | Yu | G02F 1/136209 |
| 2018/0231805 A1* | 8/2018 | Yang | G02F 1/133308 |

FOREIGN PATENT DOCUMENTS

| | | | | |
|---|---|---|---|---|
| CN | 102402065 A | | 4/2012 | |
| CN | 103439836 A | | 12/2013 | |
| CN | 103792736 A | | 5/2014 | |
| CN | 203870350 U | | 10/2014 | |
| CN | 204287658 U | | 4/2015 | |
| CN | 104635384 A | * | 5/2015 | ......... G02F 1/13394 |
| CN | 104793403 A | | 7/2015 | |
| CN | 105137668 A | | 12/2015 | |
| CN | 106200135 A | | 12/2016 | |
| CN | 206573828 U | * | 10/2017 | ........... G02F 1/0107 |
| CN | 108281472 A | | 7/2018 | |
| CN | 108415195 A | | 8/2018 | |
| CN | 207992649 U | | 10/2018 | |
| CN | 109360831 A | | 2/2019 | |
| JP | 2012168348 A | * | 9/2012 | |
| JP | 2012185457 A | * | 9/2012 | ........... G02F 1/0107 |
| KR | 10-2006-0073808 A | | 6/2006 | |

OTHER PUBLICATIONS

Office Action dated Mar. 16, 2020, issued in counterpart JP application No. 201811270370.1, with English translation. (19 pages).

* cited by examiner

Prior Art

DISPLAY PANEL AND PREPARATION METHOD THEREOF

CROSS-REFERENCE TO RELATED APPLICATIONS

This application claims benefit of the filing date of Chinese Patent Application No. 201811270370.1 filed on Oct. 29, 2018, the disclosure of which is hereby incorporated in its entirety by reference.

TECHNICAL FIELD

The present disclosure relates to display technology, in particular, to a display panel and a preparation method thereof.

BACKGROUND

As shown in FIG. 1, a periphery of the display panel 01 (for example, a liquid crystal display panel) is provided with a frame sealant 60 for sealing the first substrate 10 and the second substrate 20 to ensure the sealing performance of the entire display panel 01. In addition, the frame sealant 60 can also support the thickness of the periphery of the display panel 01.

BRIEF SUMMARY

An embodiment of the present disclosure provides a display panel. The display panel may include a first substrate, a second substrate opposite the first substrate, and a frame supporting structure between the first substrate and the second substrate in a frame area of the display panel. The frame area of the display panel may surround a display area of the display panel. The frame supporting structure may include a first frame supporting portion on at least one part of a circumference of the display area, the first frame supporting portion comprises an elastic material, and an elastic recovery rate of the elastic material is above about 80%.

Optionally, the first frame supporting portion is located on all the circumference of the display area.

Optionally, the first frame supporting portion comprises a first sub-portion and a second sub-portion that are stacked along a thickness direction of the display panel; and the second sub-portion comprises the elastic material.

Optionally, the first sub-portion comprises a frame sealant.

Optionally, the first sub-portion comprises the elastic material.

Optionally, a height of the second sub-portion is higher than a height of the first sub-portion along the thickness direction of the display panel.

Optionally, a side of the first sub-portion facing the second sub-portion has a groove, and a side of the second sub-portion facing the first sub-portion is located within the groove.

Optionally, a contacting interface between the first sub-portion and the second sub-portion is a horizontal flat surface with reference to a surface of the first substrate.

Optionally, a contacting interface between the first sub-portion and the second sub-portion is an inclined surface with reference to a surface of the first substrate.

Optionally, a contacting interface of the first sub-portion and the second sub-portion is non-planar.

Optionally, a side of the first sub-portion facing the second sub-portion has a groove, a side of the second sub-portion facing the first sub-portion has a protrusion, and the protrusion is located in the groove.

Optionally, the first frame supporting portion further comprises a third sub-portion disposed between the first sub-portion and the second sub-portion; and the third sub-section comprises a frame sealant.

Optionally, the first frame supporting portion is an integral structure along a thickness direction of the display panel; and the first frame supporting portion comprises the elastic material.

Optionally, the display panel may further include a first spacer between the first substrate and the second substrate in a light shielding area and a second spacer between the first substrate and the second substrate in the display area. The light shield area is between the frame area and the display area. The second sub-portion, the first spacer, and the second spacer are made of a same material.

Optionally, the display panel may further include a first spacer between the first substrate and the second substrate in a light shielding area, the light shielding area being between the frame area and the display area; and a second spacer between the first substrate and the second substrate in the display area; wherein the first frame supporting portion, the first spacer, and the second spacer are made of a same material and located in a same layer.

Optionally, the display panel may further include liquid crystals between the first substrate and the second substrate and located in a region surrounded by the frame area.

One example of the present disclosure is a method of forming a display panel. The method of forming the display panel may include forming a first substrate, the first substrate comprising a first sub-portion constituting a first frame supporting portion in a frame area of the display panel; the first sub-portion comprising an elastic material or a frame sealant; forming a second substrate, the second substrate comprising a second sub-portion constituting the first frame supporting portion in the frame area of the display panel; the second sub-portion comprising the elastic material; and assembling the first substrate and the second substrate to form a cell. The first sub-portion and the second sub-port are aligned and in contact with each other along a thickness direction of the first substrate.

Optionally, the method of forming the display panel may further include forming a first spacer in a light shielding area of the display panel and a second spacer in a display area of the display panel. The light shielding area is between the display area and the frame area. The second sub-portion, the first spacer, and the second spacer are formed by one patterning process.

Optionally, forming the first substrate comprises forming the first sub-portion and a third sub-portion stacking on the first sub-portion along the thickness of the first substrate, the third sub-portion being on a side of the first sub-portion opposite from the first substrate the third-portion comprising a frame sealant. Assembling the first substrate and the second substrate comprises aligning and contacting the third sub-portion and the second sub-portion with each other along the thickness direction of the first substrate.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
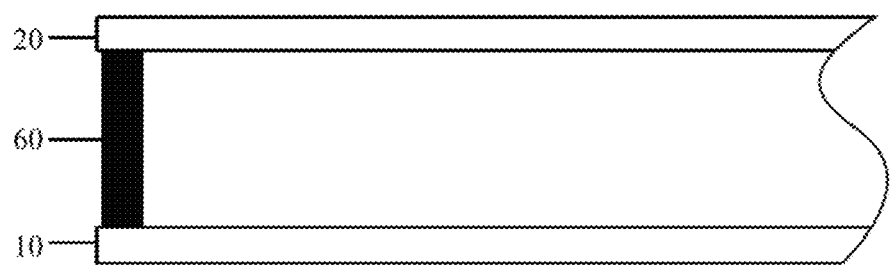
FIG. 1 is a schematic structural view of a display panel in the related art.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-17b. When referring to the figures, like strictures and elements shown throughout are indicated with like reference numerals.

Unless otherwise defined, technical terms or scientific terms used in the present disclosure are intended to be in the ordinary meaning of those of ordinary skill in the art. The words "first," "second" and similar words used in the present disclosure do not denote any order, quantity or importance, but are merely used to distinguish different components. The words "including" or "comprising" and the like mean that the element or the item preceding the word includes the element or item listed after the word and its equivalent and do not exclude other components or objects. "Coupled" and the like are not limited to physical or mechanical connections, but may include electrical connections, whether direct or indirect. "Upper," "lower," "left," "right." etc. are only used to indicate the relative positional relationship. When the absolute position of the object being described is changed, the relative positional relationship may also change accordingly.

In the description of the following embodiments, specific features, structures, materials or characteristics may be combined in any suitable manner in any one or more embodiments or examples.

Figure 2:
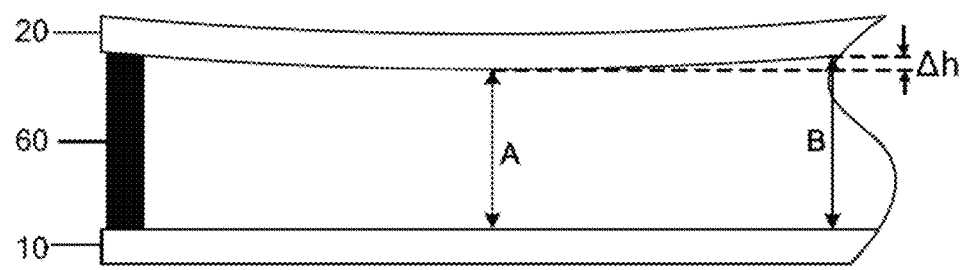
FIG. 2 is a schematic view showing a display panel pressed by an external force in the related art.

In the related art, the frame sealant 60 is generally formed by a coating process. For example, a frame sealant 60 is first applied to the first substrate 10. Then, after the first substrate 10 and the second substrate 20 are assembled into a cell, the frame sealant is cured. However, since the sealant 60 is hardened after curing (for example, UV curing or heat curing), as shown in FIG. 2, a large thickness difference (Δh) of the liquid crystal cell at A position and B position of the display panel 01 when pressed by an external force is formed, thereby resulting in light leakage. Especially for a narrow-frame, large-size display panel 01, the light leakage is very serious.

For the liquid crystal display panel, although the phenomenon of light leakage upon pressing can be solved by reducing liquid crystal retardation amount (Δnd), this may cause loss of transmittance or loss of response time.

However, based on the principle that uneven thickness of the liquid crystal cell causes the light leakage, some embodiments of the present disclosure reduce the light leakage problem by changing the sealing structure in the sealing area of the display panel, thereby not affecting optical, electrical and other characteristics of the display panel.

Figure 3A:
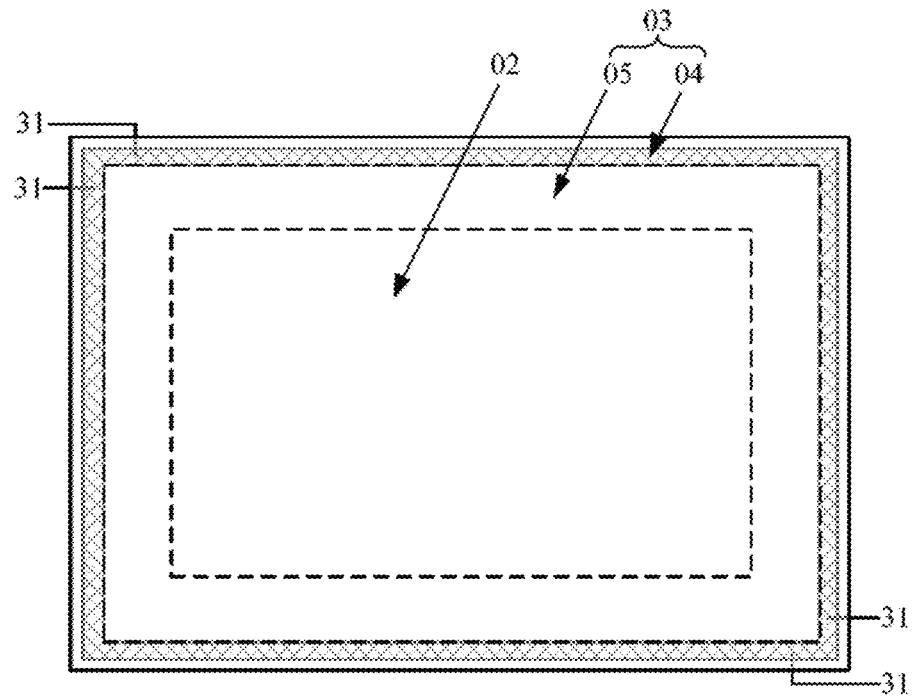
FIG. 3a is a schematic top plan view of a display panel according to one embodiment of the present disclosure.
Figure 4:
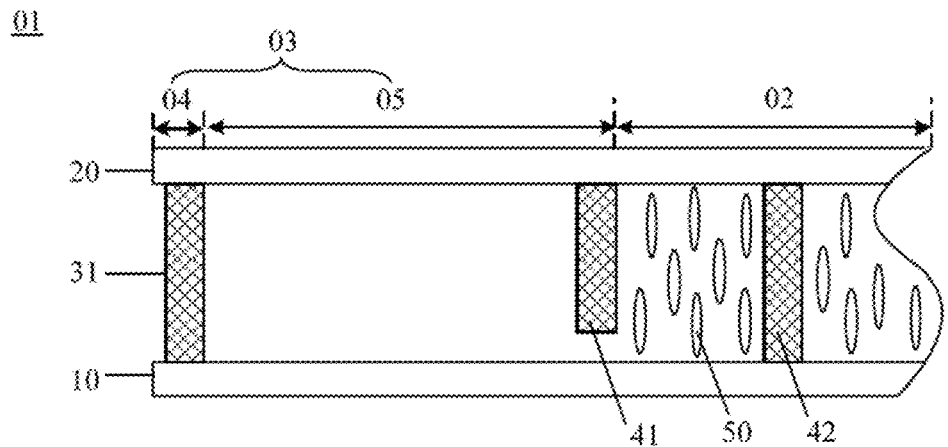
FIG. 4 is a schematic structural diagram of a display panel according to one embodiment of the present disclosure.

Accordingly, one embodiment of the present disclosure provides a display panel. As shown in FIG. 3a, the display panel 01 includes a display area 02 and a peripheral area 03 surrounding the display area 02. The peripheral area 03 includes a frame area 04, and the frame area 04 is disposed around the display area 02. As shown in FIG. 4, the display panel 01 includes a first substrate 10 and a second substrate 20 disposed opposite to each other, and a frame supporting structure disposed between the first substrate 10 and the second substrate 20 and located in the frame area 04. The frame supporting structure includes a first frame supporting portion 31. The first frame supporting portion 31 is located on at least one side of the display area 02. The material of the first frame supporting portion 31 includes an elastic material.

The elastic material refers to a type of material that deforms when subjected to an external force and can be restored or recovered to its original size and shape after the external force is removed. The elastic material may include a plastic material or a resin material or the like. For example, the elastic material may be made of acrylic material such as acrylic resin or polyethylene terephthalate (PET). In one embodiment, the material of the first frame supporting portion 31 is made of a mixture mainly composed of binder, monomer, photoinitiator, surfactant and solvent. The monomer may be a compound with many double bonds. After exposure, these double bonds can be opened and recombined to form a network of cross-linked structure with certain elasticity and hardness. In one embodiment, the elastic recovery rate of the material for the first frame supporting portion is above about 80%, preferably above about 90%, and more preferably above about 95% at ambient condition. The elastic recovery rate is a measure of the ability of a material to return to its original shape or length when a force is removed. In one embodiment, when the elastic material is stretched to 4 percent and then released, the elastic material can return to within about 80 to about 100%, preferably within about 90 to about 95%, of its original length. In one embodiment, the material for the first frame supporting portion may be elastomers including polyisoprene or natural rubber, polybutadiene, polyisobutylene, and polyurethanes. In one embodiment, the material of the first frame supporting portion is made of a photoresist.

Optionally, as shown in FIG. 4, the display panel 01 further includes liquid crystals 50 disposed between the first substrate 10 and the second substrate 20 and located in a region surrounded by the frame area 04. That is, the display panel 01 is a liquid crystal display panel.

Optionally, as shown in FIG. 3a, the peripheral area 03 includes not only a frame area 04 but also a light shielding area 05. The light shielding area 05 is located between the display area 02 and the frame area 04, and the light shielding area 05 is disposed surrounding the display area 02.

Figure 3B:
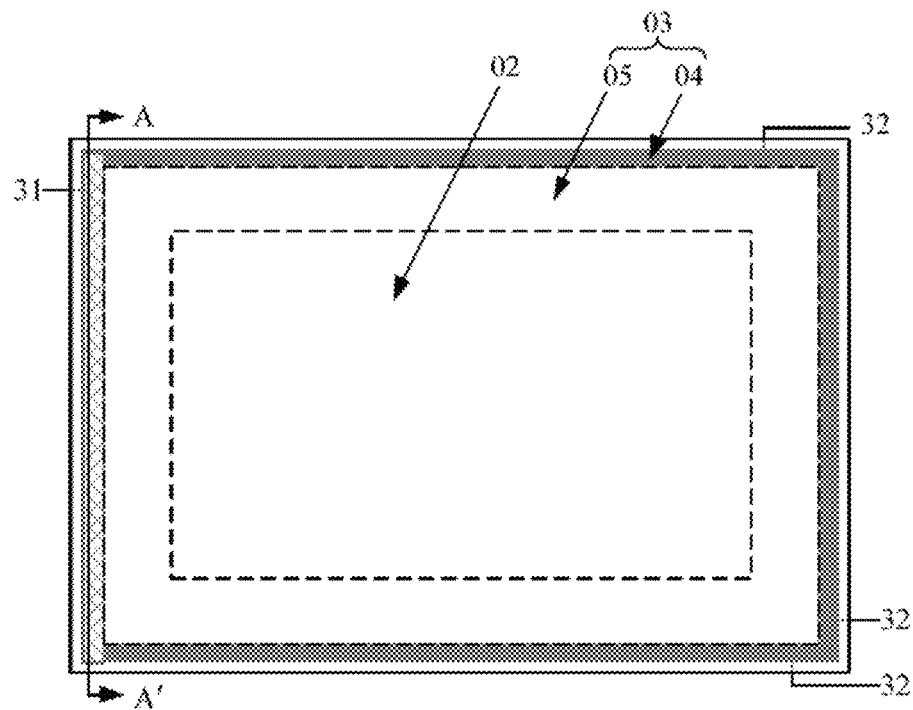
FIG. 3b is a schematic top plan view of a display panel according to one embodiment of the present disclosure.
Figure 3C:
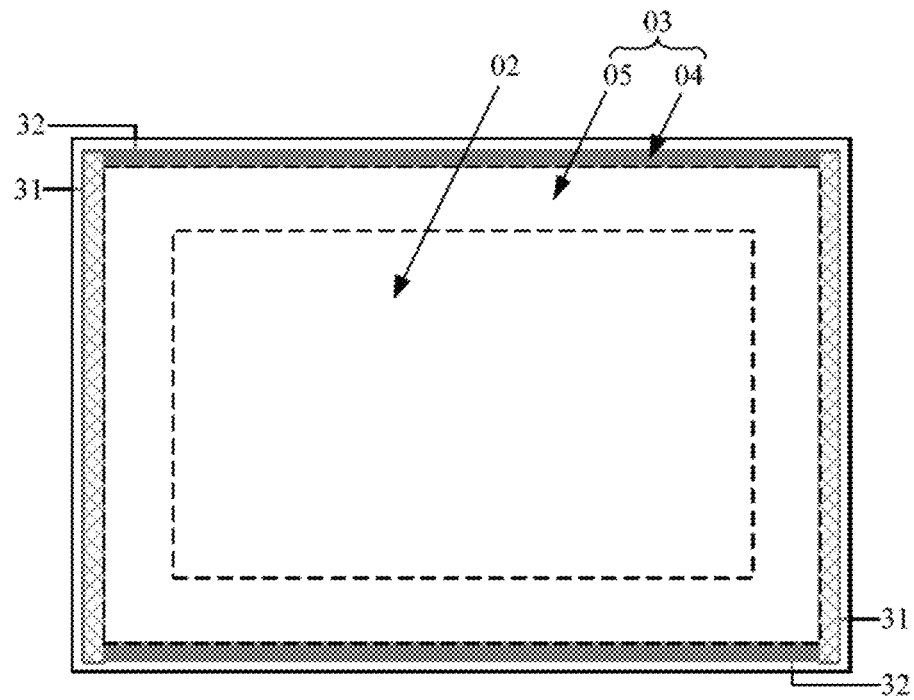
FIG. 3c is a schematic top plan view of a display panel according to one embodiment of the present disclosure.
Figure 3D:
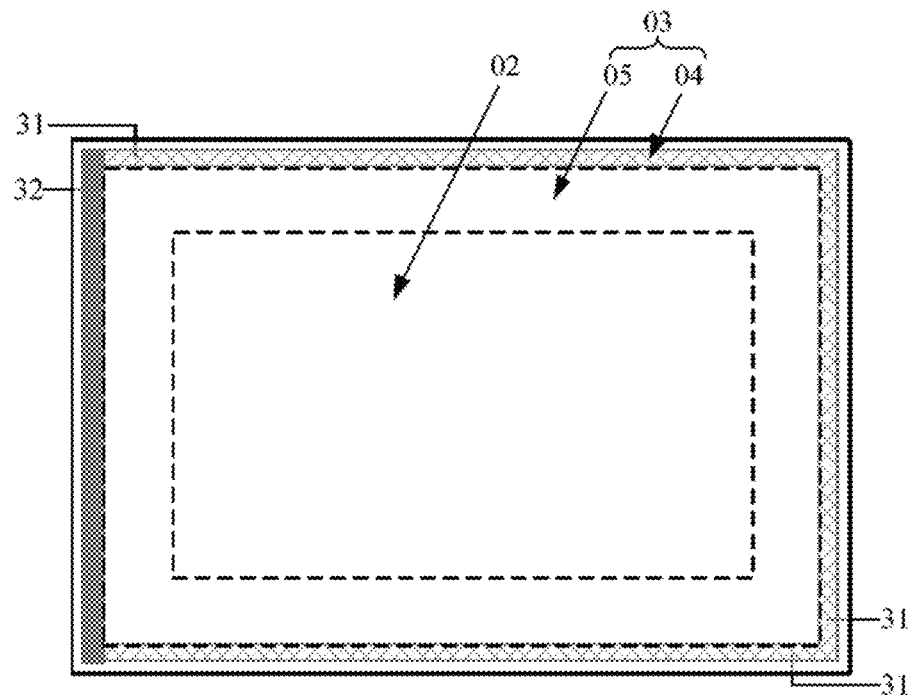
FIG. 3d is a schematic top plan view of a display panel according to one embodiment of the present disclosure.

Optionally, the frame supporting structure located in the frame area 04 is also set surrounding the display area 02. The frame supporting structure is configured to support the first substrate 10 and the second substrate 20 to maintain the first substrate 10 and the second substrate 20 apart at a certain distance. Furthermore, when the first substrate 10 and the second substrate 20 are assembled into a cell to form the display panel 01, the frame supporting structure performs sealing function. The first frame supporting portion 31 is located on at least one side of the display area 02. In one embodiment, as shown in FIG. 3b, the first frame supporting portion 31 may be disposed only on one side of the display area 02, and the second frame supporting portion 32 may be disposed on the other sides of the display area 02. In one embodiment, as shown in FIGS. 3c and 3d, the first frame supporting portion 31 may be provided on two sides or three sides of the display area 02, and the second frame supporting portion 32 may be provided on the other sides. The second frame supporting portion 32 may be made of a conventional frame sealant.

In some embodiments, as shown in FIG. 3a, a first frame supporting portion 31 is disposed on each side of the display area 02, that is, the frame supporting structure is composed of the first frame supporting portion 31.

Figure 5:
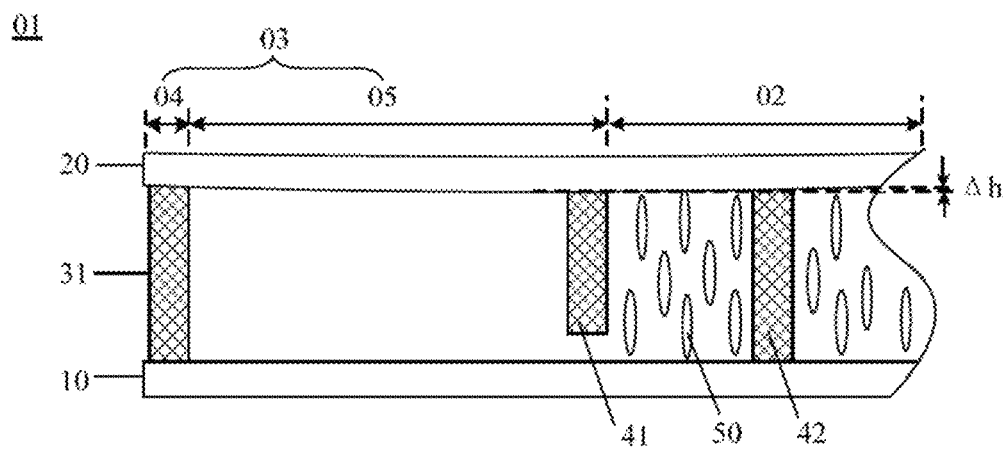
FIG. 5 is a schematic diagram of a display panel pressed by an external force according to one embodiment of the present disclosure.

In the case where the first frame supporting portion 31 includes an elastic material, as shown in FIG. 5, when the display panel 01 is pressed by an external force, the first frame supporting portion 31 generates a certain compression due to the characteristics of the elastic material itself. Thus, comparing with the display panel 01 using the conventional sealant in FIG. 2, this embodiment of the present disclosure can reduce the thickness difference ($\Delta h$) of the display panel 01 when pressed.

In one embodiment, the frame supporting structure consists of the first frame supporting portion 31. Since the material of the first frame supporting portion 31 includes an elastic material, the elastic material is disposed on each side of the display area 02. In this way, when any position of the display panel 01 is pressed, all the elastic material will be deformed by the force. As such, the entire display panel 01 is more evenly stressed, thereby preventing the light leakage caused by uneven force on one side of the display panel 01.

Optionally, the first substrate 10 is an array substrate. For example, the first substrate includes a thin film transistor, data lines, gate lines, and the like disposed in the display area 02. The thin film transistor includes a source electrode, a drain electrode, an active layer, a gate electrode, and a gate insulating layer.

The second substrate 20 may be a color film (CF) substrate. For example, the second substrate 20 may include a color film, a black matrix, or the like disposed in the display area 02.

The embodiment of the present disclosure provides a display panel 01, which is provided with a frame supporting structure in a frame area 04 of the display panel 01. The frame supporting structure includes a first frame supporting portion 31, and the material of the first frame supporting portion 31 includes an elastic material. When the display panel 01 is pressed by an external force, the elastic material is deformed according to the pressure, and accordingly a certain compression is generated. As such, the thickness of the display panel 01 after being pressed is relatively uniform. Therefore, the display panel 01 provided by the embodiments of the present disclosure can reduce the light leakage problem in the display panel 01 using the conventional frame sealant in the related art. The display panel 01 using the conventional frame sealant in the related art has a large thickness difference at different places of the liquid crystal cell when the display panel 01 is pressed, thereby resulting in a light leakage problem. Based on this, the display panel 01 provided by the embodiment of the present disclosure can improve picture quality, thereby improving product yield and competitiveness.

Optionally, as shown in FIG. 4, the first frame supporting portion 31 is an integrated structure along the thickness direction of the display panel 01. The material of the first frame supporting portion 31 is an elastic material. In this case, the first frame supporting structure 31 may be formed on the first substrate 10 or on the second substrate 20.

The first frame supporting portion 31 is made of an elastic material, so that the first frame supporting portion 31 has the largest elasticity and deformation capability, thereby reducing to the greatest extent the problem of the light leakage due to the uneven thickness of the display panel 01 caused by the external force pressing on the display panel 01.

In addition, in the related art, the display panel using the conventional frame sealant may have non-uniform coating of the sealant during the formation of the sealant. The sealant may easily cover the drive circuit or the power supply line around the array substrate, thereby affecting heat dissipation and causing local temperature to rise. As such, high temperature short of the traces usually occurs. Moreover, due to the non-uniform coating of the sealant, the display panel is likely subjected to uneven pressure, thereby generating horizontal stripes.

In the embodiment of the present disclosure, when the material of the first frame supporting portion 31 is an elastic material, especially in the case where the frame supporting structure is composed of the first frame supporting portion 31, the first frame supporting portion 31 of the elastic material can be formed by a photolithography and etching process. As such, the problem of high temperature short of the traces and horizontal stripes caused by the non-uniform coating of the frame sealant in the display panel in the related art using the conventional frame sealant can be avoided.

In one embodiment, as shown in FIG. 4, a first spacer 41 located between the first substrate 10 and the second substrate 20 is disposed in the light shielding region 05. A second spacer 42 located between the first substrate 10 and the second substrate 20 is disposed in the display area 02. Optionally, the first frame supporting portion 31 is made of the same material as the first spacer 41 and the second spacer 42. That is, the first frame supporting portion 31 is located on the same substrate as the first spacer 41 and the second spacer 42, for example, on the second substrate 20. Furthermore, the first frame supporting portion 31, the first spacer 41, and the second spacer 42 are formed by a same patterning process including photolithography, etching process. Thus, the number of patterning processes does not increase for the preparation of the first frame supporting portion 31.

Wherein, the first spacer 41 plays a supporting function in the light shielding area 05, and the second spacer 42 plays a supporting function in the display area 02.

Optionally, as shown in FIG. 6a-FIG. 6b and FIG. 7-FIG. 10, the first frame supporting portion 31 includes a first sub-portion 311 and a second sub-portion 312 stacked in the thickness direction of the display panel. The material of the second sub-portion 312 is an elastic material. Optionally, the first sub-portion 311 and the second sub-portion 312 are formed on the first substrate 10 and the second substrate 20, respectively.

The material of the first sub-portion 311 is not limited herein. By the cooperation of the first sub-portion 311 and the second sub-portion 312, the frame supporting structure including the first frame supporting portion 31 can reduce the thickness difference of the display panel 01 when the display panel 01 is pressed, thereby improving the light leakage phenomenon.

Figure 6A:
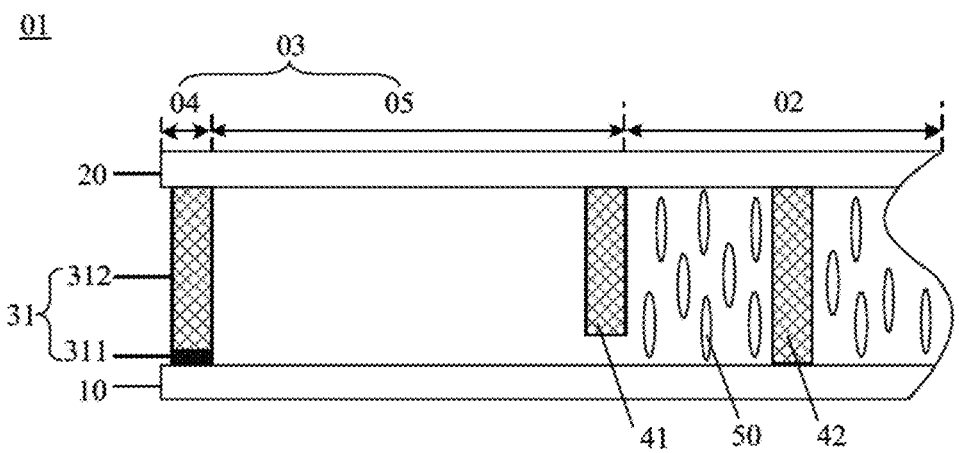
FIG. 6a is a schematic structural diagram of a display panel according to one embodiment of the present disclosure.
Figure 6B:
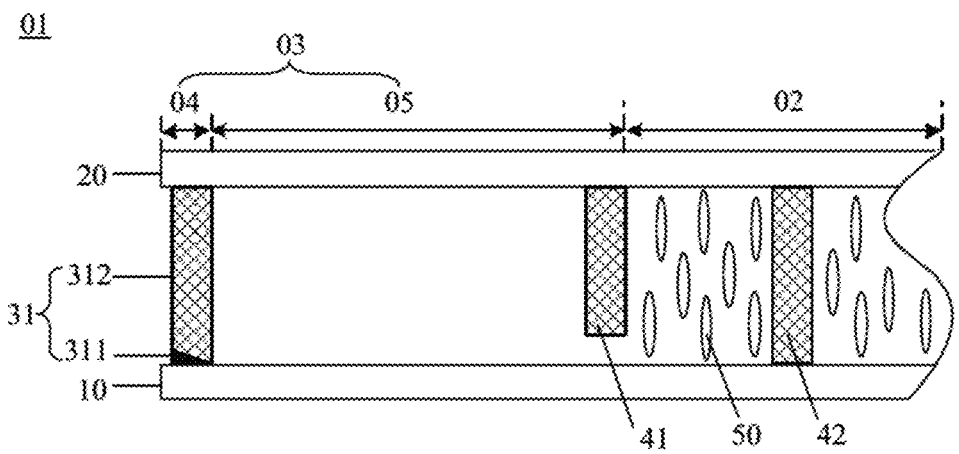
FIG. 6b is a schematic structural diagram of a display panel according to one embodiment of the present disclosure.

In one embodiment, as shown in FIGS. 6a and 6b, the first spacer 41 between the first substrate 10 and the second substrate 20 is disposed in the light shielding region 05, and the display area 02 is provided with a second spacer 42 between the first substrate 10 and the second substrate 20. The second sub-portion 312 is in the same layer and made of the same material as the first spacer 41 and the second spacer 42. That is, the second sub-portion 312 is located on the same substrate as the first spacer 41 and the second spacer 42, for example, on the second substrate 20, and is formed in the same patterning process as the first spacer 41 and the second spacer 42. As such, the preparation of the second sub-portion 312 does not increase the number of patterning processes.

Optionally, as shown in FIGS. 6a and 6b, the material of the first sub-portion 311 is a frame sealant.

Since the second sub-portion 312 is directly formed on, for example, the second substrate 20, when the first sub-portion 311 using the sealant material is located between the second sub-portion 312 and the first substrate 10, the sealing property of the first frame supporting portion 31 and the first substrate 10 can be enhanced to ensure the sealing performance of the entire display panel 01.

Optionally, along the thickness direction of the display panel 01, the height of the second sub-portion 312 is higher than the height of the first sub-portion 311.

In the case where the material of the first sub-portion 311 is a frame sealant and the material of the second sub-portion 312 is an elastic material, the sealant is only used to enhance the sealing property, and the elastic material plays a major role in generating a certain deformation when pressed. By making the height of the second sub-portion 312 higher than the height of the first sub-portion 311, on the one hand, the light leakage problem caused by the uneven thickness of the display panel 01 when deformed by the pressure can be improved. On the other hand, the problem of large thickness difference ($\Delta h$) of the liquid crystal cell under gravity or heat, which usually results in gravity Mura (streak), can be avoided.

Since the higher the second sub-portion 312 is, the stronger the elastic deformation capability is, the better the effect of improving the thickness unevenness and the gravity Mura problem after the display panel 01 is pressed. Therefore, the higher the height of the second sub-portion 312 of the elastic material, the better.

It should be noted that, in the case where the material of the first sub-portion 311 is a frame sealant and the material of the second sub-portion 312 is an elastic material, the thickness of the sealant is determined by the coating accuracy of the sealant and the thickness of the elastic material. The thickness of the elastic material is determined by the desired limit of the thickness difference of the display panel 01. That is, the corresponding amount of compression of the elastic material is calculated based on the required reduction of the thickness difference of the display panel 01, and then the thickness of the second sub-portion 312 is obtained based on the corresponding amount of compression of the elastic material. The thickness of the first sub-portion 311 is obtained by subtracting the thickness of the second sub-portion 312 from the distance between the first substrate 10 and the second substrate 20.

Optionally, as shown in FIG. 6 a, the contact interface of the first sub-portion 311 and the second sub-portion 312 is a horizontal or flat interface with reference to the surface of the first substrate or the second substrate.

Figure 6C:
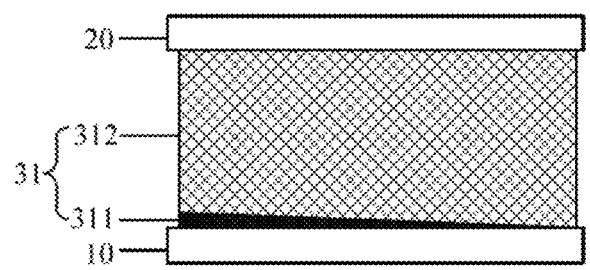
FIG. 6c is a cross-sectional view taken along line AN of FIG. 3b.

Alternatively, optionally, as shown in FIGS. 6b and 6c, the contact interface of the first sub-portion 311 and the second sub-portion 312 is an inclined interface with reference to the surface of the first substrate or the second substrate.

When the contact interface of the first sub-portion 311 and the second sub-portion 312 is an inclined interface, comparing to the contact interface being a horizontal interface, the proportion of the second sub-portion 312 is larger. As such, the support force is stronger, and the elastic deformation ability is stronger, so that the problem of uneven thickness of the display panel when the display panel 01 is pressed and the gravity Mura problem are more reduced.

Figure 7:
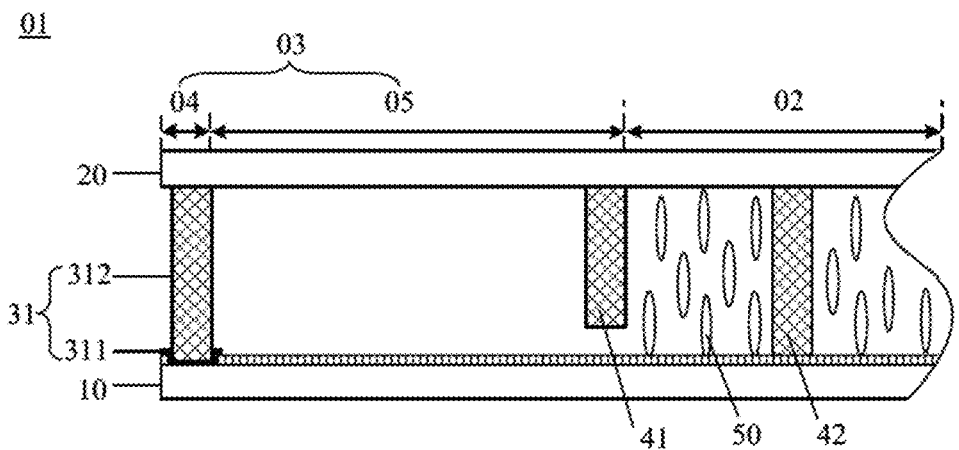
FIG. 7 is a schematic structural diagram of a display panel according to one embodiment of the present disclosure.

Optionally, as shown in FIG. 7, a side of the first sub-portion 311 facing the second sub-portion 312 has a groove, and a side of the second sub-portion 312 facing the first sub-portion 311 is located in the groove.

In some embodiments, a groove is provided on the film layer of the first substrate 10. When the sealant is applied, the side of the first sub-portion 311 facing the second sub-portion 312 also naturally forms a groove. In this case, the side of the second sub-portion 312 facing the first sub-portion 311 is located in the groove, and the second sub-portion 312 located in the groove is wrapped by the sealant.

It can be understood that since the side of the second sub-portion 312 facing the first sub-portion 311 is located in the groove of the first sub-portion 311, in the direction of the thickness of the display panel 01, the orthographic projection of the first sub-portion 311 on the first substrate completely covers the orthographic projection of the second sub-portion 312 on the first substrate, and the area of the orthographic projection of the first sub-portion 311 on the first substrate is greater than the area of the orthographic projection of the second sub-portion 312 on the first substrate. In one embodiment, the second sub-portion 312 is disposed on the second substrate 20. Such structural design improves adhesive and sealing properties of the second sub-portion 312 to the first substrate 10. As such, the entire display panel 01 is more stable and better sealed.

Figure 8:
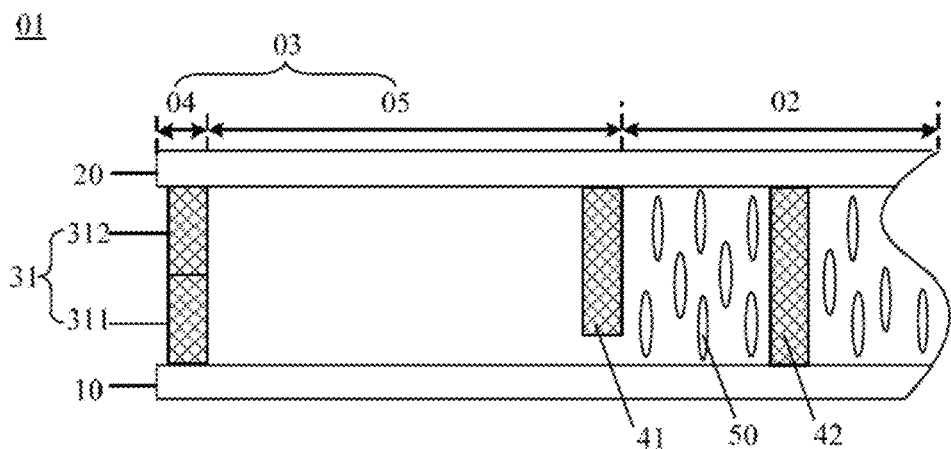
FIG. 8 is a schematic structural diagram of a display panel according to one embodiment of the present disclosure.

Optionally, as shown in FIG. 8, the material of the first sub-portion 311 is also an elastic material. The materials of the first sub-portion 311 and the second sub-portion 312 are the same. In this case, the first frame supporting portion 31 is entirely made of an elastic material, so that the first frame supporting portion 31 has the largest elasticity and the strongest deformation capability. As such, the problems of light leakage due to non-uniform thickness of the display panel 01 when it was pressed by an external force can be reduced to the greatest extent.

In addition, in the related art, the display panel 01 using the conventional frame sealant may have uneven coating of the sealant during the formation of the sealant, and the drive circuit or the power supply trace around the array substrate may be easily covered by the uneven coating, thereby affecting heat dissipation and increasing local temperature. As such, the problem of high temperature short often occurs. Moreover, since the sealant coating is unevenly applied, the display panel 01 may be locally unevenly pressed, thereby causing horizontal stripes.

In the embodiments of the present disclosure, when the material of the first frame supporting portion 31 is an elastic material, especially in the case where the frame supporting structure is composed of the first frame supporting portion 31, the first frame supporting portion 31 composed of the elastic material can be formed by photolithography and etching process. Therefore, the problem of high temperature short and horizontal stripes caused by uneven coating of the sealant in the display panel 01 using the conventional frame sealant in the related art can be avoided.

Figure 9:
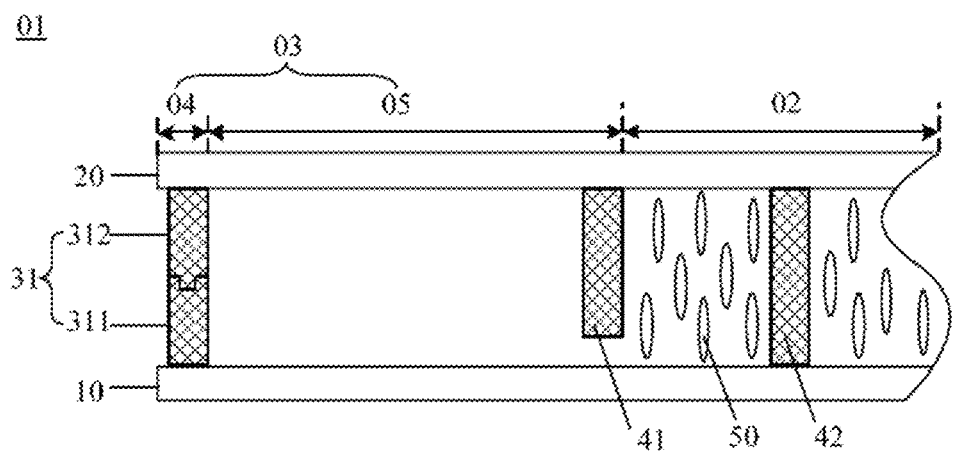
FIG. 9 is a schematic structural diagram of a display panel according to one embodiment of the present disclosure.
Figure 10:
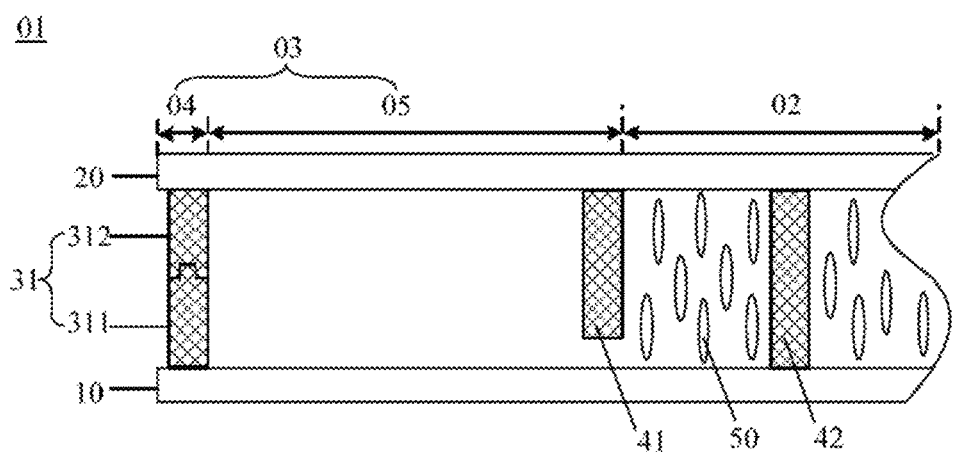
FIG. 10 is a schematic structural diagram of a display panel according to one embodiment of the present disclosure.

In one embodiment, the materials of the first sub-portion 311 and the second sub-portion 312 are both elastic materials. Optionally, as shown in FIGS. 9 and 10, the contact interface of the first sub-portion 311 and the second sub-portion 312 are not flat.

In one embodiment, the contact interface of the first sub-portion 311 and the second sub-portion 312 is not flat. As shown in FIG. 9, a side of the first sub-portion 311 facing the second sub-portion 312 has a groove, and a side of the second sub-portion 312 facing the first sub-portion 311 has a protrusion. Alternatively, as shown in FIG. 10, a side of the first sub-portion 311 facing the second sub-portion 312 has a protrusion, and a side of the second sub-portion 312 facing the first sub-portion 311 has a groove. Certainly, the non-planar contact interface of the first sub-portion 311 and the second sub-portion 312 may have other geometry, and details thereof are not described herein again.

The contact interface of the first sub-portion 311 and the second sub-portion 312 are non-planar, so that after the first substrate 10 and the second substrate 20 are assembled to form the display panel 01, the first sub-portion 311 and the second sub-portion 312 can be more firmly attached together. As such, the stability and the sealing property are better.

Figure 11:
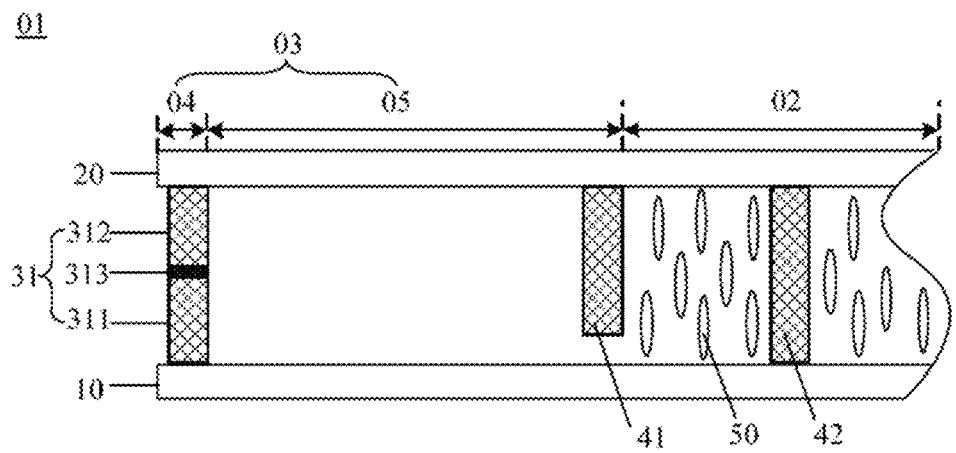
FIG. 11 is a schematic structural diagram of a display panel according to one embodiment of the present disclosure.

Optionally, as shown in FIG. 11, the first frame supporting portion 31 further includes a third sub-portion 313 disposed between the first sub-portion 311 and the second sub-portion 312. The third sub-portion 313 is made of a frame sealant.

In the case where the materials of the first sub-portion 311 and the second sub-portion 312 are both elastic materials, a sealant is disposed between the two portions of the elastic material, so that after the first substrate 10 and the second substrate 20 are assembled to form the display panel 01, the elastic materials of the first sub-portion 311 and the second sub-portion 312 are bonded by the sealant. As such, the sealing property of the display panel is better and the structure of the display panel is also more stable.

In some embodiments of the present disclosure, all or a majority of the material of the first frame supporting portion 31 is an elastic material. Thus, the amount of the frame sealant used could be reduced or eliminated. As such, the problem of high temperature short of the surrounding traces and horizontal stripes due to uneven coating of the frame sealant will be reduced or eliminated. At the same time, due to the reduced use of the sealant, the plastic balls or the silicon balls added to the sealant 60 for enhancing the supporting force are also reduced or eliminated. This is conducive to environmental protection and cost reduction. In addition, the occurrence of liquid crystal puncture is also significantly reduced.

One embodiment of the present disclosure further provides a display apparatus comprising the above display panel. The display apparatus has the same beneficial effects as the display panel provided by the above embodiments.

Here, for the liquid crystal display apparatus, in addition to the display panel described above, a backlight assembly may be further included.

Wherein, the liquid crystal display apparatus may be any apparatus that displays an image regardless of motion (eg, video) or fixed (eg, still image) and regardless of text or picture. More specifically, it is contemplated that the described embodiments can be implemented in or associated with a variety of electronic devices. The various electronic devices include, but not limited to, mobile phones, wireless devices, personal data assistants (PDAs), handheld or portable computers, GPS receivers/navigators, cameras, MP4 video players, video cameras, game consoles, watches, clocks, calculators, television monitors, flat panel displays, computer monitors, car displays (eg, odometer displays, etc.), navigators, cockpit controls and/or displays, monitors of camera views (eg, rear view camera display in vehicles), electronic photo, electronic billboard or signage, projector, architectural structure, packaging and aesthetic structure (eg, display for an image of a piece of jewelry), etc.

The embodiment of the present disclosure further provides a method for preparing a display panel. As shown in FIGS. 3a-3d, the display panel 01 includes a display area 02 and a peripheral area 03, and the peripheral area 03 includes a frame area 04. The frame area 04 surrounds the display area 02, and the frame area 04 has a frame supporting structure. The frame supporting structure is composed of a first frame supporting portion 31.

Figure 12:
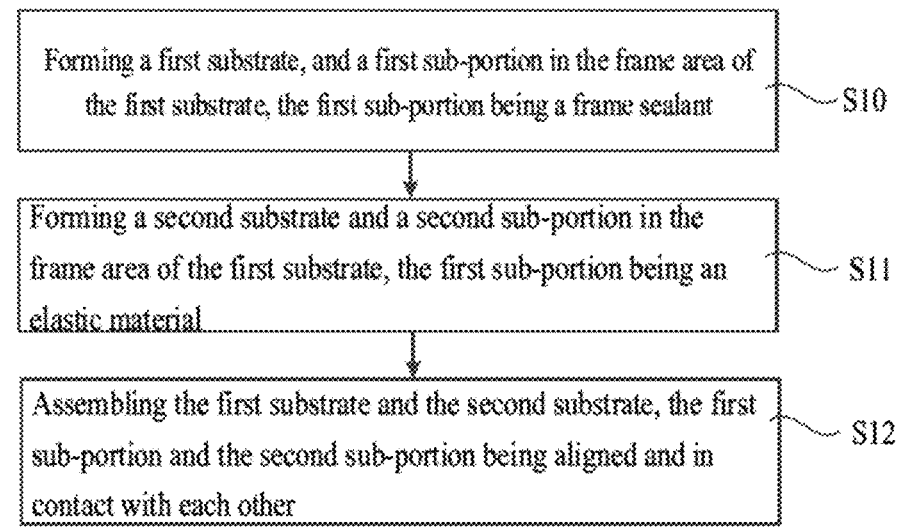
FIG. 12 is a flowchart of preparing a display panel according to one embodiment of the present disclosure.
Figure 13A:
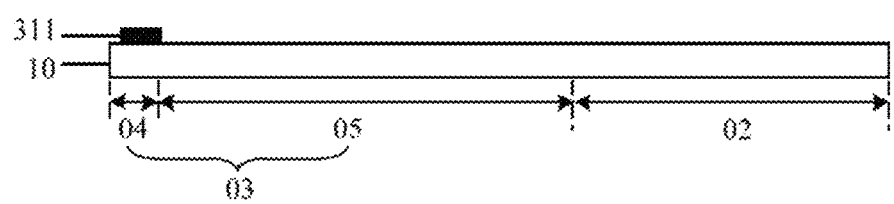
FIG. 13a is a schematic structural diagram of a first substrate according to one embodiment of the present disclosure.

As shown in FIG. 12, the method for preparing the display panel 01 includes the following steps:

In step S10, as shown in FIG. 13a, a first substrate 10 is formed. A first sub-portion 311 constituting the first frame supporting portion 31 is formed in the frame area 04 of the first substrate 10. The first sub-portion 311 is made of a frame sealant.

In one embodiment, the first sub-portion 311 composed of the sealant is formed on the first substrate using a coating process.

Figure 13B:
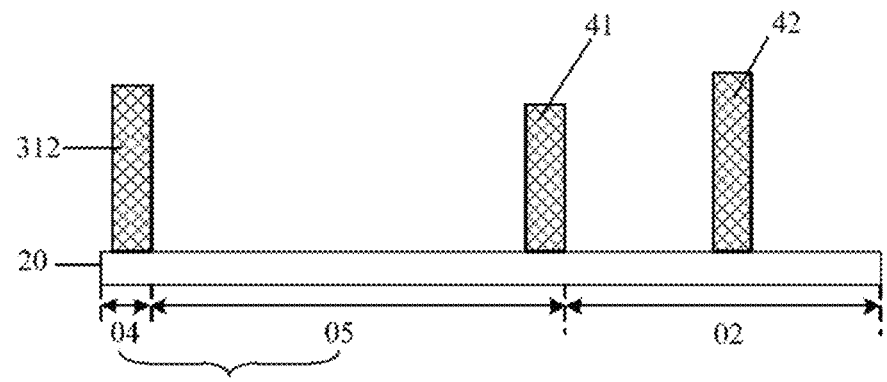
FIG. 13b is a schematic structural diagram of a second substrate according to one embodiment of the present disclosure.

In step S11, as shown in FIG. 13b, a second substrate 20 is formed. A second sub-portion 312 constituting the first frame supporting portion 31 is formed in the frame area 04 of the second substrate 20. The second sub-portion 312 is made of an elastic material.

In one embodiment, the second sub-portion 312, which is composed of the elastic material, is formed by photolithography and etching processes.

In step S12, as shown in FIG. 6a-6b or FIG. 7, the first substrate 10 and the second substrate 20 are assembled to form a cell. The first sub-portion 311 and the second sub-portion 312 are aligned and in contact with each other along the thickness direction of the first substrate 10.

After the step S12, that is, after the first sub-portion 311 and the second sub-portion 312 are aligned and contacted with each other along the thickness direction of the first substrate 10, the sealant of the first sub-portion 311 can be cured.

It should be noted that, for the first sub-portion 311 and the second sub-portion 312, reference may be made to the first sub-portion 311 and the second sub-portion 312 in the display panel 01.

In the method of manufacturing the display panel 01 according to the embodiments of the present disclosure, the frame supporting structure composed of the first frame supporting portion 31 is formed in the frame area 04 of the display panel 01. Furthermore, the material of the first sub-portion 311 of the first frame supporting portion 31 is a frame sealant, and the material of the second sub-portion 312 of the first frame supporting portion 31 is an elastic material. On one hand, because the second sub-portion 312 is made of the elastic material, when the display panel 01 is pressed by an external force, the elastic material is deformed under the pressure to generate a certain compression, so that the thickness of the display panel 01 is more uniform after the pressing. On the other hand, the sealing property of the display panel 01 can be improved by forming the first sub-portion 311 of the sealant.

Optionally, the peripheral area 03 further includes a light shielding area 05, and the light shielding area 05 is located between the display area 02 and the frame area 04. Furthermore, as shown in FIG. 13b, a first spacer 41 is formed in the light shielding area 05 of the second substrate 20, and a second spacer 42 is formed in the display area 02 of the second substrate 20. The second sub-portion 312, the first spacer 41, and the second spacer 42 are formed by one patterning process.

One embodiment of the present disclosure provides a method for preparing the display panel 01. The display panel 01 includes a display area 02 and a peripheral area 03, and the peripheral area 03 includes a frame area 04. The frame area 04 surrounds the display area 02, and the frame area 04 has a frame supporting structure. The frame supporting structure is composed of a first frame supporting portion 31.

Figure 14:
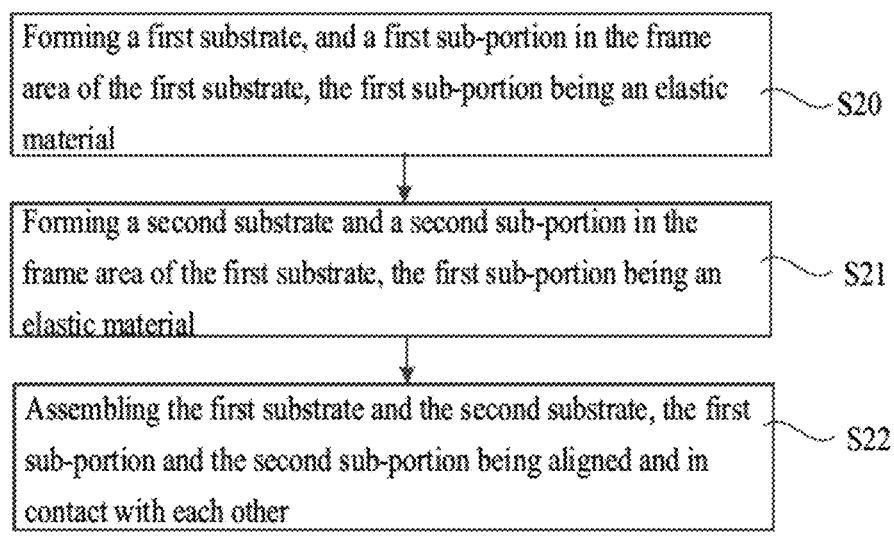
FIG. 14 is a flowchart of a method for preparing a display panel according to one embodiment of the present disclosure.
Figure 15A:
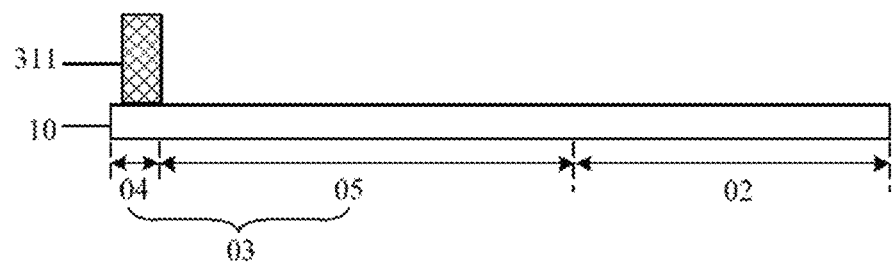
FIG. 15a is a schematic structural diagram of a first substrate according to one embodiment of the present disclosure.

As shown in FIG. 14, the method for preparing the display panel 01 includes the following:

In step S20, as shown in FIG. 15a, a first substrate 10 is formed. A first sub-portion 311 constituting the first frame-frame supporting portion 31 is formed in the frame area 04 of the first substrate 10. The material of the first sub-portion 311 is an elastic material.

Figure 15B:
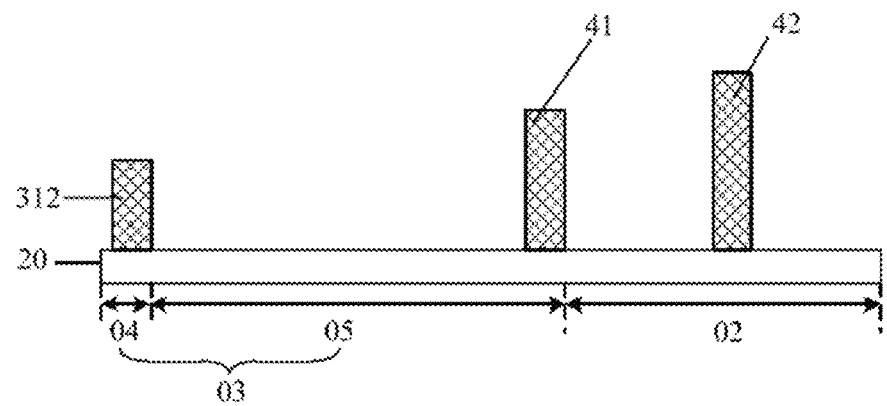
FIG. 15b is a schematic structural diagram of a second substrate according to one embodiment of the present disclosure.

In step S21, as shown in FIG. 15b, a second substrate 10 is formed. A second sub-portion 312 constituting the first frame-frame supporting portion 31 is formed in the frame area 04 of the second substrate 10. The material of the second sub-portion 312 is an elastic material.

In step S22, as shown in FIG. 8, the first substrate 10 and the second substrate 20 are paired with each other, and the first sub-portion 311 and the second sub-portion 312 are correspondingly positioned and contacted along the thickness direction of the first substrate 10.

In the method of manufacturing the display panel 01 according to the embodiment of the present disclosure, the first frame supporting portion 31 is disposed in the frame area 04 of the display panel 01, and the materials of the first sub-portion 311 and the second sub-portion 312 of the first frame supporting portion 31 include an elastic material. Therefore, on one hand, the problems of high-temperature short of the peripheral traces and horizontal stripes due to uneven coating during the formation of the sealant in the display panel 01 using the conventional sealant in the related art can be avoided. On the other hand, when the first sub-portion 311 and the second sub-portion 312 are made of an elastic material, the elastic material is deformed under the pressure when the display panel 01 is pressed by an external force, and a certain compression characteristic is generated. As such, the thickness of the display panel 01 is more uniform after being pressed.

Optionally, the peripheral area 03 further includes a light shielding area 05, and the light shielding area 05 is located between the display area 02 and the frame area 04. As shown in FIG. 8, a first spacer 41 is further formed in the light shielding area 05 of the second substrate 20, and a second spacer 42 is further formed in the display area 02 of the second substrate 20. The first sub-portion 311, the second sub-portion 312, the first spacer 41, and the second spacer 42 are formed by one patterning process. In one embodiment, the second sub-portion 312 is formed on the second substrate 20 by exposure. Then, the first sub-portion 311 may be coated on the second sub-portion 312 or coated on the first substrate 10, and functions as a sealant after the two substrates are combined.

The embodiment of the present disclosure further provides a method for preparing the display panel 01, the display panel 01 includes a display area 02 and a peripheral area 03, and the peripheral area 03 includes a frame area 04. The frame area 04 surrounds the display area 02. The frame area 04 has a frame supporting structure, and the frame supporting structure is composed of a first frame supporting portion 31.

Figure 16:
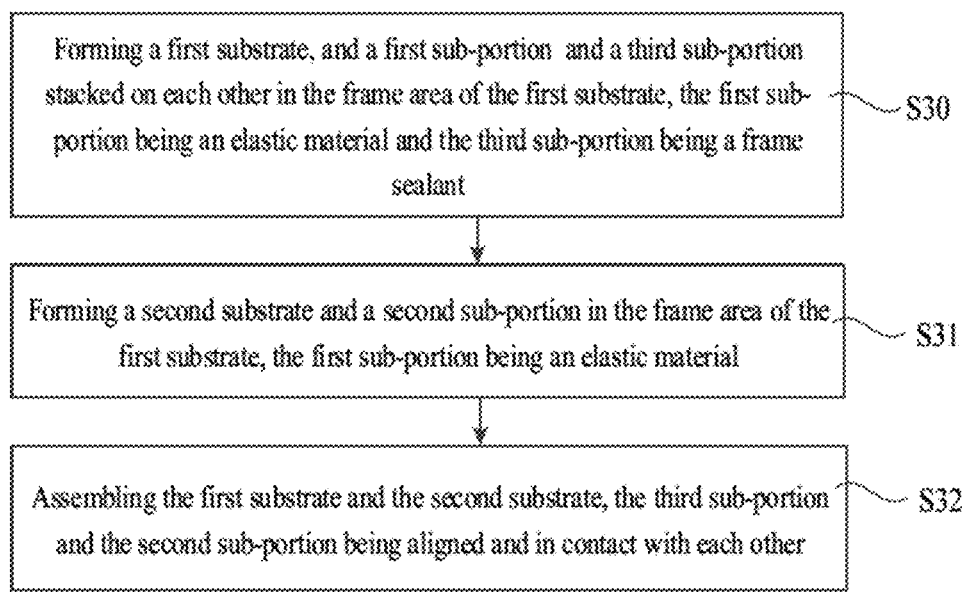
FIG. 16 is a flowchart of preparing a display panel according to one embodiment of the present disclosure.
Figure 17A:
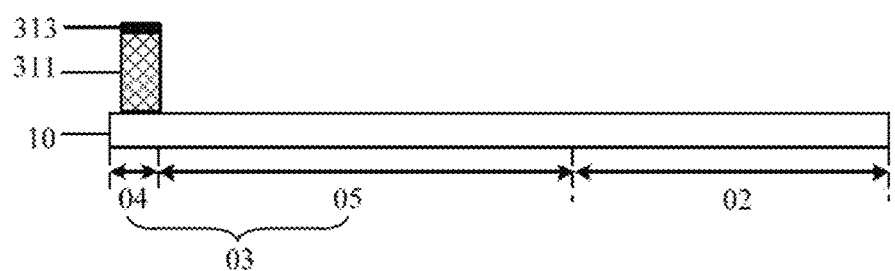
FIG. 17a is a schematic structural diagram of a first substrate according to one embodiment of the present disclosure.

As shown in FIG. 16, the method for preparing the display panel 01 includes the following:

In step S30, as shown in FIG. 17a, a first substrate 10 is formed. A first sub-portion 311 and a third sub-portion 313 constituting the first frame-frame supporting portion 31 are formed in the frame area 04 of the first substrate 10. The third sub-portion 313 is located on a side of the first sub-portion 311 opposite from the first substrate along the thickness direction of the first substrate 10, and the first sub-portion 311 is located on the surface of the first substrate 10. The material of the first sub-portion 311 is an elastic material, and the material of the third sub-portion 313 is a frame sealant.

Figure 17B:
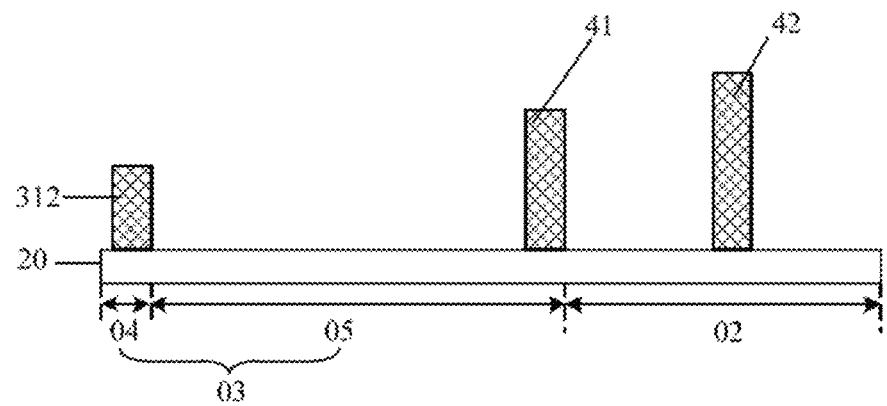
FIG. 17b is a schematic structural diagram of a second substrate according to one embodiment of the present disclosure.

In step S31, as shown in FIG. 17b, a second substrate 20 is formed. A second sub-portion 312 constituting the first frame supporting portion 31 is formed in the frame area 04 of the second substrate 20. The material of the second sub-portion 312 is an elastic material.

In step S32, as shown in FIG. 11, the first substrate 10 and the second substrate 20 are assembled to form a cell. The second sub-portion 312 and the third sub-portion 313 are correspondingly aligned and in contact with each other along the thickness direction of the first substrate 10.

After step S32, that is, after the second sub-portion 312 and the third sub-portion 313 are correspondingly aligned and in contact with each other along the thickness direction of the first substrate 10, the sealant of the third sub-portion 313 can be cured.

In the method of manufacturing the display panel 01 according to the embodiments of the present disclosure, the frame supporting structure composed of the first frame supporting portion 31 is formed in the frame area 04 of the display panel 01. The first sub-portion 311 and the second sub-portion 312 of the first frame supporting portion 31 are made of an elastic material, and the material of the third sub-portion 313 is a frame sealant. Therefore, on one hand, the third sub-portion 313 composed of the frame sealant is only used for the sealing connection of the first sub-portion 311 and the second sub-portion 312, and is not in contact with the first substrate 10. Therefore, there is no problem of high temperature short of the surrounding traces and horizontal stripes caused by uneven coating of the sealant. On the other hand, when the first sub-portion 311 and the second sub-portion 312 are formed of an elastic material, when pressed by an external force, the elastic material is deformed under the pressure, and a certain compression characteristic is generated. As such, the thickness of the display panel is relatively more uniform after the display panel 01 is pressed. In addition, the sealing property of the display panel 01 can be improved by forming the third sub-portion 313 composed of the sealant.

Optionally, the peripheral area 03 further includes a light shielding area 05, and the light shielding area 05 is located between the display area 02 and the frame area 04. As shown in FIG. 11, a first spacer 41 is further formed in the light shielding area 05 of the second substrate 20, and a second spacer 42 is further formed in the display area 02 of the second substrate 20. The first sub-portion 311, the second sub-portion 312, the first spacer 41, and the second spacer 42 are formed by one patterning process.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. A display panel, comprising:
   a first substrate;
   a second substrate opposite the first substrate; and
   a frame supporting structure between the first substrate and the second substrate in a frame area of the display panel, the frame area of the display panel surrounding a display area of the display panel;
   wherein the frame supporting structure comprises a first frame supporting portion on at least one part of a circumference of the display area, and the first frame supporting portion comprises an elastic material, and an elastic recovery rate of the elastic material is above about 80%;
   the first frame supporting portion comprises a first sub-portion and a second sub-portion that are stacked along a thickness direction of the display panel; and the second sub-portion comprises the elastic material;
   a height of the second sub-portion is higher than a height of the first sub-portion along the thickness direction of the display panel;
   a side of the first sub-portion facing the second sub-portion has a groove, and a side of the second sub-portion facing the first sub-portion is located within the groove;
   the first sub-portion comprises a frame sealant, and the second sub-portion in the groove is wrapped by the frame sealant;
   an orthographic projection of the first sub-portion on the first substrate completely covers an orthographic projection of the second sub-portion on the first substrate, and an area of the orthographic projection of the first sub-portion on the first substrate is greater than an area of the orthographic projection of the second sub-portion on the first substrate;
   the display panel further includes a first spacer between the first substrate and the second substrate in a light shielding area, and the light shield area is between the frame area and the display area; and
   the groove is provided on a layer, the layer is disposed on the first substrate, and the layer covers an area of the first substrate, and the area is wider than the light shield area.

2. The display panel of claim 1, wherein the first frame supporting portion is located on all the circumference of the display area.

3. The display panel of claim 1, further comprising:
   a second spacer between the first substrate and the second substrate in the display area;
   wherein the second sub-portion, the first spacer, and the second spacer are made of a same material.

4. The display panel of claim 1, further comprising liquid crystals between the first substrate and the second substrate and located in a region surrounded by the frame area.

5. A method of forming a display panel, the method comprising:
   forming a first substrate, the first substrate comprising a first sub-portion constituting a first frame supporting portion in a frame area of the display panel;
   forming a groove in the first sub-portion;
   forming a second substrate, the second substrate comprising a second sub-portion constituting the first frame supporting portion in the frame area of the display panel, and the second sub-portion comprising the elastic material; and
   assembling the first substrate and the second substrate to form a cell, a top part of the second sub-portion being placed in the groove, wherein the first sub-portion comprises a frame sealant, the top part of the second sub-portion in the groove is wrapped by the frame sealant, and a height of the second sub-portion is higher than a height of the first sub-portion along a thickness direction of the display panel;
   wherein the method further includes forming a first spacer in a light shielding area of the display panel and a second spacer in a display area of the display panel, the light shielding area being between the display area and the frame area;

the second sub-portion, the first spacer, and the second spacer are formed by one patterning process;

an orthographic projection of the first sub-portion on the first substrate completely covers an orthographic projection of the second sub-portion on the first substrate, and an area of the orthographic projection of the first sub-portion on the first substrate is greater than an area of the orthographic projection of the second sub-portion on the first substrate; and the groove is proved on a layer, the layer is disposed on the first substrate, and the layer covers an area of the first substrate, and the area is wider than the light shield area.

* * * * *